April 5, 1966  R. L. COLBURN  3,244,861
HEATING ELEMENT
Filed Oct. 22, 1963
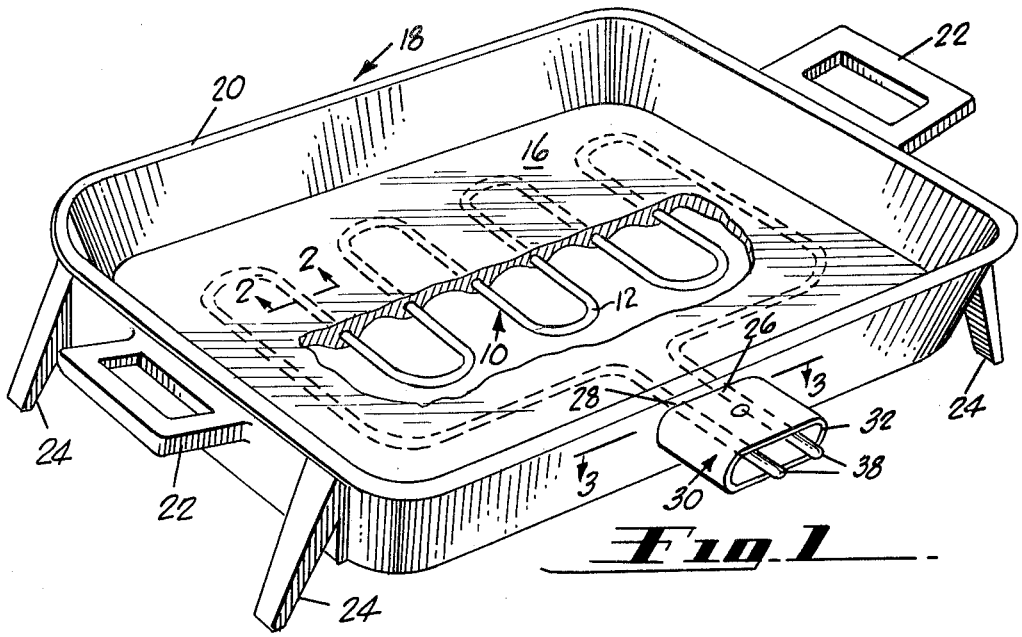
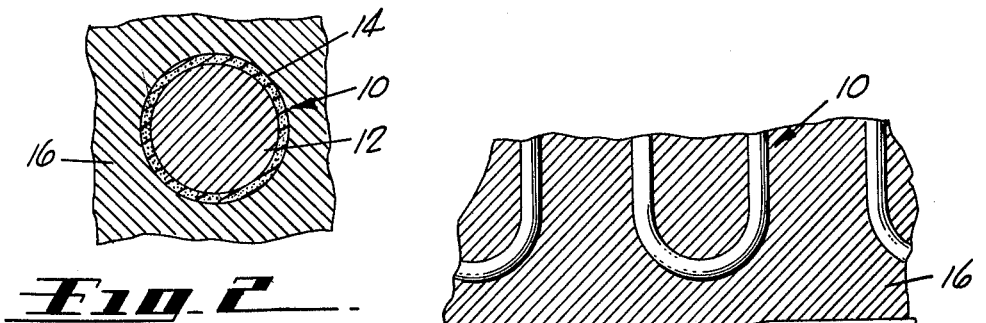
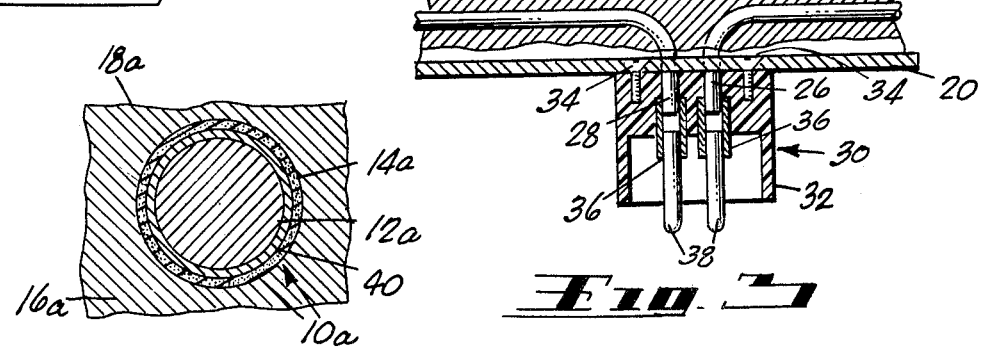
INVENTOR.
ROGER L. COLBURN
BY
*Max E. Shirk*
ATTORNEY

United States Patent Office 3,244,861
Patented Apr. 5, 1966

3,244,861
HEATING ELEMENT
Roger L. Colburn, Los Angeles, Calif., assignor to Douglas Aircraft Company, Inc., Santa Monica, Calif.
Filed Oct. 22, 1963, Ser. No. 317,983
2 Claims. (Cl. 219—438)

The present invention relates generally to heating elements and relates more particularly to heating elements of the type commonly employed in cooking utensils and the like.

There are many contemporary cooking utensils and other kitchen appliances which employ electrical heating elements. These heating elements commonly take two forms, the first of these forms being Nichrome or other similar types of wire that is disposed in a suitable continuous passage in a wall of a cooking utensil. The passage is of a size that is substantially larger than the wire element and suitable insulating material, often in the form of a powder, is disposed between the wire heating element and the wall of the passage. Another common form of heating element used for purposes similar to that of the present invention includes open-wire type heating elements frequently of Nichrome or the like that are supported on suitable electrical insulating stand-offs that are in turn attached to a wall of a cooking utensil. With heating elements of this type, it is necessary that a suitable shield be employed to prevent accidental contact with the elements.

In the first these prior known structures involving the utilization of insulated wire heating elements disposed in continuous passageways, it is necessary that the utensil be originally formed as by casting or the like and that the continuous passage be prepared. Thereafter the wire heating element and the electrical insulation must be disposed in the passageway. Such construction is not only expensive as far as the original preparation of the utensil is concerned, but also in regard to the difficulty and time-consuming operation necessary to establish the heating element and the insulating material in the passage. It is desirable that cooking utensils of the type described herein be immersible in water to enable cleansing thereof. When heating elements of the type involving a wire disposed in a passage with insulating material therebetween are used, it is necessary to hermetically seal the ends of the heating element where they extend from the cooking utensil and to suitable plug means to enable attachment to a source of electrical energy.

In the types of heating elements that are bare and disposed on electrical insulating stand-offs, additional manufacturing costs are encountered, inasmuch as the stand-offs must be installed, the heating elements attached and any shielding established and secured in position. Additionally, it is clear that construction of this type is not immersible and that serious problems exist relative to heat transfer between the element and the wall or walls of the cooking utensil. In both of the prior types of heating elements and means of associating such elements with cooking utensils, the thermal gaps created by the insulating material about a heating element, or an air gap as the case may be, precludes efficient and effective heat transfer to the cooking utensil and, in most instances, creates undesirable "hot spots" in areas of the cooking utensil. It is also clear that heating elements supported on individual stand-offs present the additional problem of possible short circuiting between the element and the body of the cooking utensil due to vibration or shock of the utensil during normal handling thereof.

In order to solve some of the problems encountered in prior cooking utensils having electrical heating elements, the elements have been encased in a sheathing prior to disposition in castings and the like. In such instances it has still been necessary to insulate the heating element from the sheathing, thus presenting the same problems as described hereinbefore relative to the expensive manufacture and efficient thermal conductivity.

The configuration of the heating element and the method disposing the element of the present invention in a wall or walls of a cooking utensil are such as to avoid the problems previously presented in connection with prior known structures intended for a similar purpose. Briefly, in accordance with the present invention, the heating element is provided with an electrical insulating material thereon which is created by an oxide of the material of the heating element. The element thus prepared being cast or otherwise disposed directly in metallic material of a wall or walls of a cooking utensil whereby to produce a low-cost, efficient, effective and reliable electrically heating cooking utensil having efficient heat transfer characteristics between the heating element and the utensil walls while retaining desirable complete immersible characteristics and eliminating problems associated with short circuiting and the like.

It is therefore one important object of the present invention to provide a heating element for use in association with and as an integral part of a cooking utensil that is inexpensive in manufacture.

It is another important object of the present invention to provide a cooking utensil having a heating element imbedded in a wall thereof in a manner producing a rugged reliable structure that has a substantial utilization time expectancy.

It is a still further important object of the present invention to provide a combination heating element and cooking utensil wherein the cooking utensil is completely immersible in a liquid without damage to the heating element and wherein the requirement for expensive hermetic type seals is eliminated.

Other and further important objects of the invention will become apparent from the disclosures in the following detailed specification, appended claims, and accompanying drawing wherein:

FIGURE 1 is a perspective view of a typical cooking utensil employing the heating element of the present invention;

FIG. 2 is an enlarged fragmentary sectional view showing the construction of the present heating element and method of disposition in a wall of a cooking utensil, as taken substantially as indicated by line 2—2, FIG. 1;

FIG. 3 is an enlarged fragmentary sectional view taken substantially as indicated by line 3—3, FIG. 1, and illustrating the manner of connecting ends of the present heating element to a plug receptacle of the like; and FIG. 4 is an enlarged fragmentary sectional view similar to FIG. 2 illustrating an alternate form of heating element and insulating means therefor.

Referring again to the drawing and particularly to FIGS. 1–3, the heating element constituting a first embodiment of the present invention, generally designated 10, includes a suitable resistive conductor 12 which may take a tubular form, not shown, or the form of a wire core, as shown in FIG. 2. The resistive conductor 12 is covered with an electrical insulating material 14. The electrical insulating material 14 is created by an oxide of the material of the resistive conductor 12. While a number of different types of material for the resistive conductor 12 and insulating material 14 will manifest themselves, aluminum may be conveniently anodized to form the layer of insulating material 14. Thus, the resistive conductor 12 becomes a heating element while the anodized layer 14 surrounding it insulates it electrically, but is not thermally insulating. The thickness of the anodized layer 14 may be controlled by the anodizing voltage, as is well known in the art.

The heating element 10 may be formed into any suitable shape, such as that shown in FIG. 1, before the anodized layer 14 is formed thereon. The anodized heating element 10 may then be cast or otherwise disposed directly in a heating panel or wall 16 of a suitable electrical appliance, such as a cooking utensil 18. The cooking utensil 18 includes an upstanding sidewall 20 to which a pair of carrying handles 22 and a plurality of legs 24 may be attached or formed integrally with the sidewall 20. The cooking utensil 18 may be made of a suitable heat conducting material, such as aluminum, which may be cast at a temperature of about 1050 to 1100 degrees F. At this temperature the heating element 10 will not melt. The heating element 10 is positioned so that its ends 26 and 28 extend through the sidewall 20. The casting operation seals them in fluid tight relationship with the sidewall 20. This eliminates the need for hermetic seals to make the cooking utensil 18 completely immersible. The ends 26 and 28 may be connected to a source of electrical power, not shown, by an electrical connector 30 having a dielectric block 32 attached to the sidewall 20 by suitable screws 34. A pair of electrical connectors 36 are mounted in the block 32 in engagement with the ends 26, 28. An electrical pin 38 is inserted into each receptacle 36 and may be connected to an electrical outlet, not shown, to supply current to the heating element 10.

Referring now to FIG. 4, a heating element constituting a second embodiment of the present invention, generally resignated 10a, includes a resistive conductor 12a which may be made of a refractory metal such as titanium or may comprise a Nichrome wire or the like. The conductor 12a is plated with a layer of aluminum 40. The material of the outer surface of the conductor, in this case aluminum, may then be anodized to form an anodized layer 14a constituting the electrical insulating layer. The heating element 10a may then be cast into a wall 16a of the cooking utensil 18a.

While the particular heating elements herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:
1. A cooking utensil comprising:
   an electrical, resistive conductor having ends connectable to a source of electric power;
   an electrical insulating layer created by an oxide of the material on the surface of said conductor surrounding said conductor and forming an integral part thereof; and
   heat conductive wall means, said conductor being embedded within and contiguous with said wall means, whereby said conductor becomes an integral part of said wall means, said wall means including a bottom wall and an upstanding sidewall, said ends of said conductor extending exteriorly of said wall means for connection to said source of power.
2. The cooking utensil of claim 1 wherein said conductor is aluminum and said electrical insulating layer is created by anodizing said aluminum.

References Cited by the Examiner

UNITED STATES PATENTS

| | | | |
|---|---|---|---|
| 522,718 | 7/1894 | Leonard | 338—230 X |
| 1,046,888 | 12/1912 | Stanley | 219—436 |
| 2,060,968 | 11/1936 | Beck et al. | 338—230 X |
| 2,164,813 | 7/1939 | Gunther | 219—436 |
| 2,360,264 | 10/1944 | Osterheld | 338—244 |
| 2,368,771 | 2/1945 | Osterheld | 338—268 X |
| 2,431,998 | 12/1947 | Ely | 219—436 |
| 2,528,019 | 10/1950 | Storm | 338—230 X |
| 2,533,615 | 12/1950 | Osterheld | 338—268 X |
| 2,907,862 | 10/1959 | Huck | 219—441 |
| 2,959,663 | 11/1960 | Fenn | 219—270 |

FOREIGN PATENTS

| | | |
|---|---|---|
| 497,673 | 9/1919 | France. |
| 249,858 | 12/1927 | Great Britain. |
| 244,554 | 4/1947 | Switzerland. |

RICHARD M. WOOD, *Primary Examiner.*
ANTHONY BARTIS, *Examiner.*